United States Patent
McCulley et al.

(10) Patent No.: US 6,863,350 B1
(45) Date of Patent: Mar. 8, 2005

(54) TRAVEL-READY CHILD RESTRAINT

(75) Inventors: Jeremiah McCulley, Seymour, IN (US); Therese A. Baker, Nashville, IN (US)

(73) Assignee: Cosco Management, Inc., Wilimington, DE (US)

(*) Notice: Subject to any disclaimer, the term of this patent is extended or adjusted under 35 U.S.C. 154(b) by 0 days.

(21) Appl. No.: 10/743,205

(22) Filed: Dec. 22, 2003

(51) Int. Cl.[7] ............................................... A47C 3/00
(52) U.S. Cl. ............... 297/465; 297/219.12; 297/230.1; 297/467; 224/576
(58) Field of Search ........................ 297/219.12, 250.1, 297/254, 230.1, 230.12, 352, 452.14, 467, 468, 481, 485, 486; 206/466; 150/154, 158; 224/576, 585, 318, 319, 328

(56) References Cited

U.S. PATENT DOCUMENTS

| | | | |
|---|---|---|---|
| 4,848,793 A | | 7/1989 | Huspen |
| 5,819,998 A | * | 10/1998 | Chehebar ..................... 224/153 |
| 6,006,967 A | * | 12/1999 | Tsao ............................ 224/153 |
| 6,086,152 A | * | 7/2000 | Zeller ....................... 297/284.5 |
| 6,237,998 B1 | * | 5/2001 | Aprile .................... 297/219.12 |
| 6,428,098 B1 | * | 8/2002 | Allbaugh ............... 297/219.12 |

OTHER PUBLICATIONS

Guide for CONFETY® Compact Child Seat (before Dec. 22, 2003).

* cited by examiner

Primary Examiner—Laurie K. Cranmer
(74) Attorney, Agent, or Firm—Barnes & Thornburg LLP

(57) ABSTRACT

An apparatus comprises a child restraint and a bag coupled to the child restraint. The bag is configured to receive the child restraint for transport and storage of the child restraint.

17 Claims, 6 Drawing Sheets

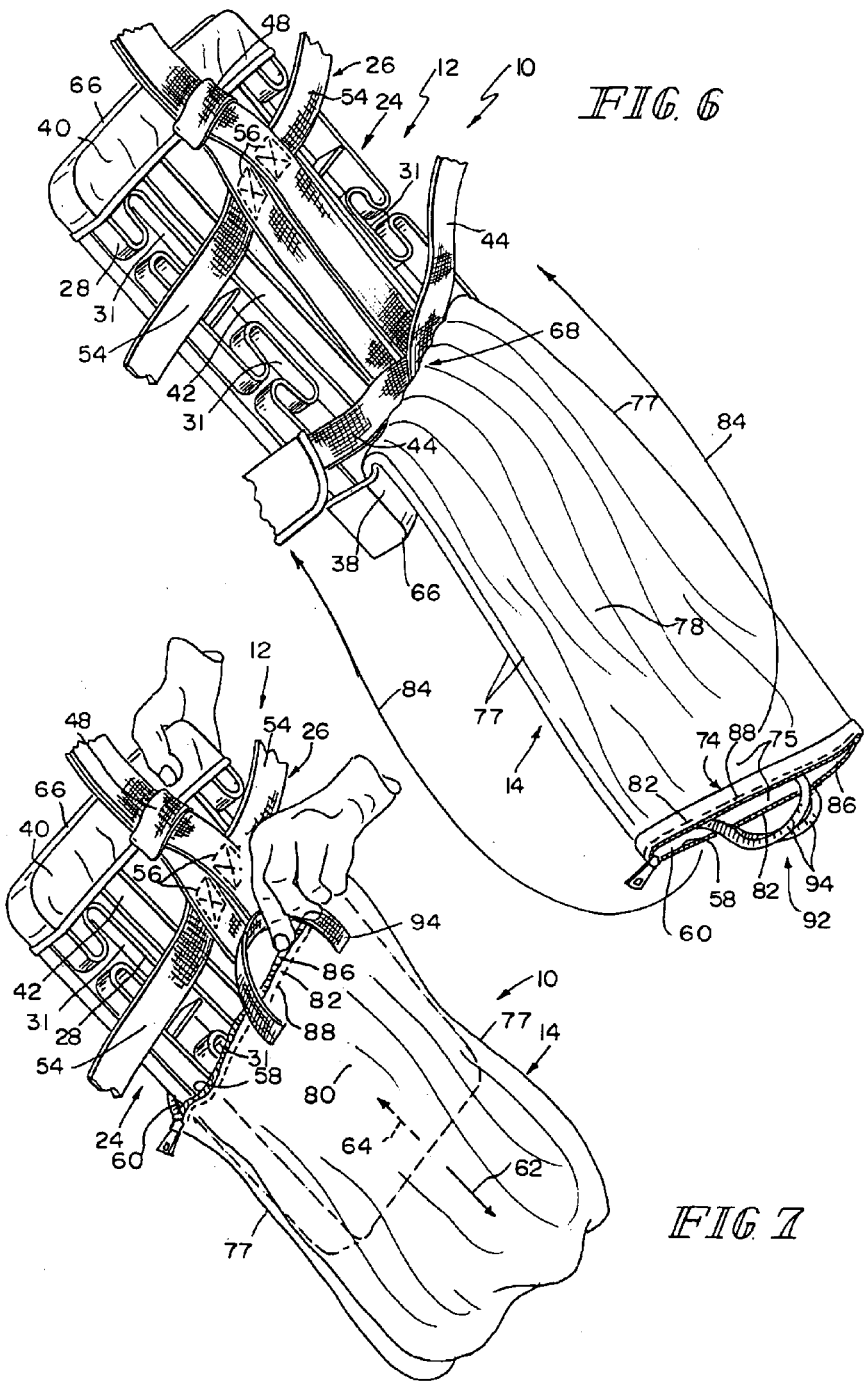

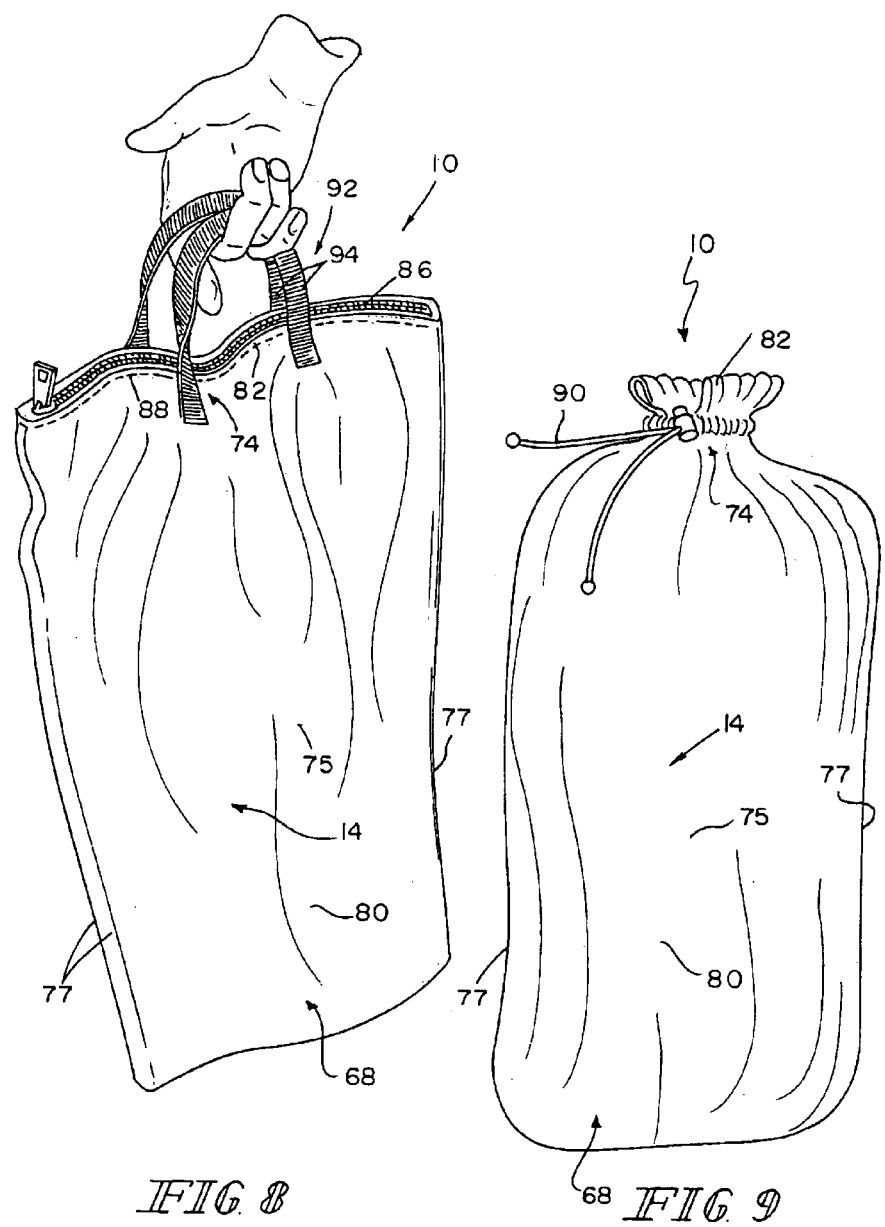

TRAVEL-READY CHILD RESTRAINT

BACKGROUND

The present disclosure relates to child restraints. More particularly, the present disclosure relates to apparatus for restraining a child seated on a seat in a vehicle.

Some child restraints are used in vehicles to restrain a child in a seated position. The child restraint may be positioned on a seat of the vehicle for use of the child restraint. When not in use, the child restraint may be removed from the vehicle.

SUMMARY

According to the present disclosure, an apparatus comprises a child restraint and a bag. The child restraint includes a back support configured to support the back of a seated child and a restraint unit configured to restrain the seated child against the back support. The bag is coupled to the child restraint and formed to include an interior storage region and an opening for reception of the back support and the restraint unit through the opening into the interior storage region for storage of the child restraint and for removal of the back support and the restraint unit from the interior storage region through the opening for use of the child restraint.

In some embodiments, the bag can be turned right-side in and inside out. The bag is turned right-side in during reception of the child restraint in the interior storage region and is turned inside out during removal of the child restraint from the interior storage region.

During use of the child restraint, the bag can be stored in a bag receiver. The bag receiver is, for example, a pouch positioned along a rear side of the back support.

Additional features of the present disclosure will become apparent to those skilled in the art upon consideration of the following detailed description exemplifying the best mode of the disclosure as presently perceived.

BRIEF DESCRIPTION OF THE DRAWINGS

The detailed description particularly refers to the accompanying figures in which:

FIG. 6 is a perspective view showing the child restraint turned upside down and the bag turned inside out and showing a pair of arrows representing the direction that panels of the bag will travel to turn the bag right-side in for reception of the child restraint in the bag;

FIG. 7 is a perspective view showing insertion of the child restraint through an opening formed in the bag into an interior storage region formed in the bag;

FIG. 8 is a perspective view showing use of a zipper to close the bag and use of a handle to carry the bag with the child restraint (not shown) now positioned in the bag; and FIG. 9 is a perspective view showing use of a draw-string instead of a zipper to close the bag.

DETAILED DESCRIPTION

Figure 1A:
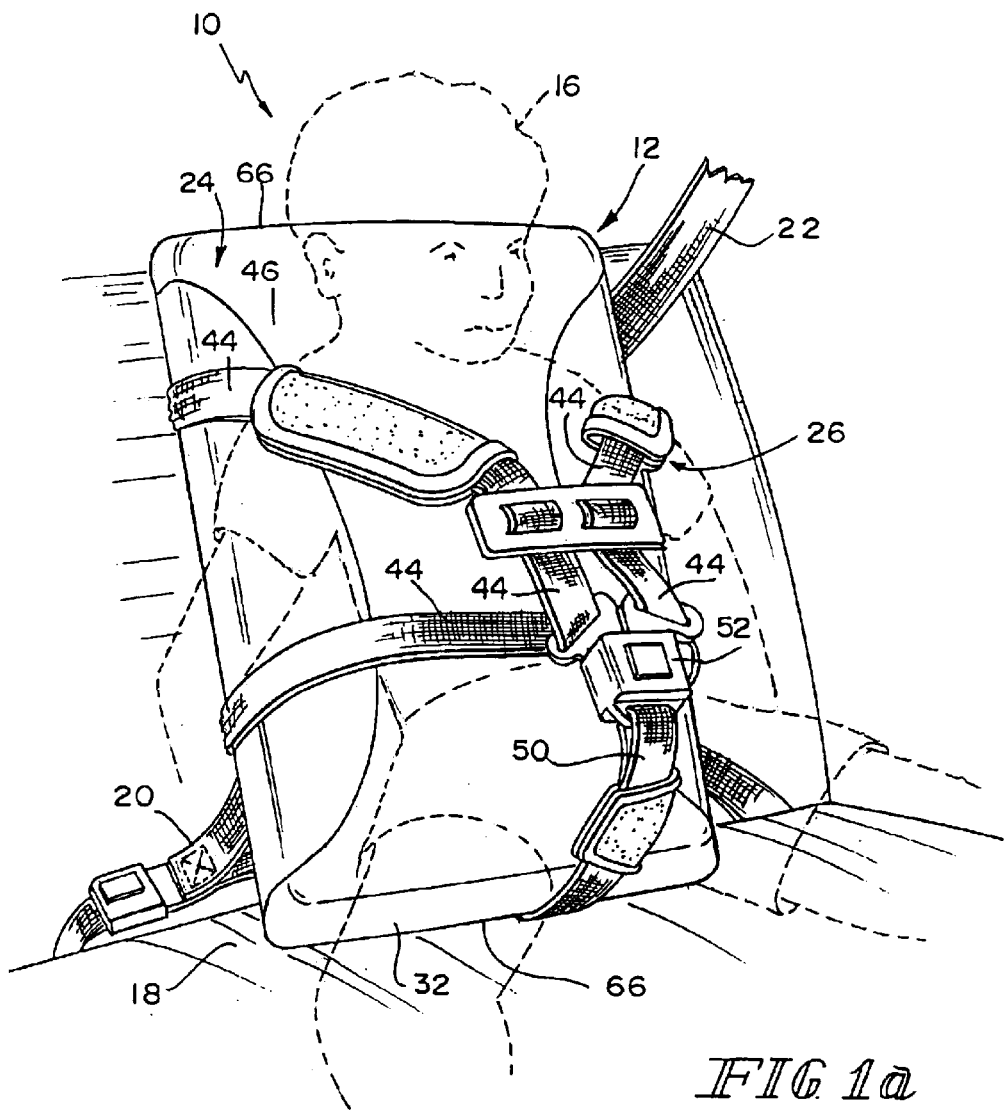
FIG. 1a is a perspective view showing a front side of a child restraint including a back support configured to support the back of a child (in phantom) seated on a seat of a vehicle and a restraint unit (e.g., a harness unit) configured to restrain the seated child against the back support.
Figure 1B:
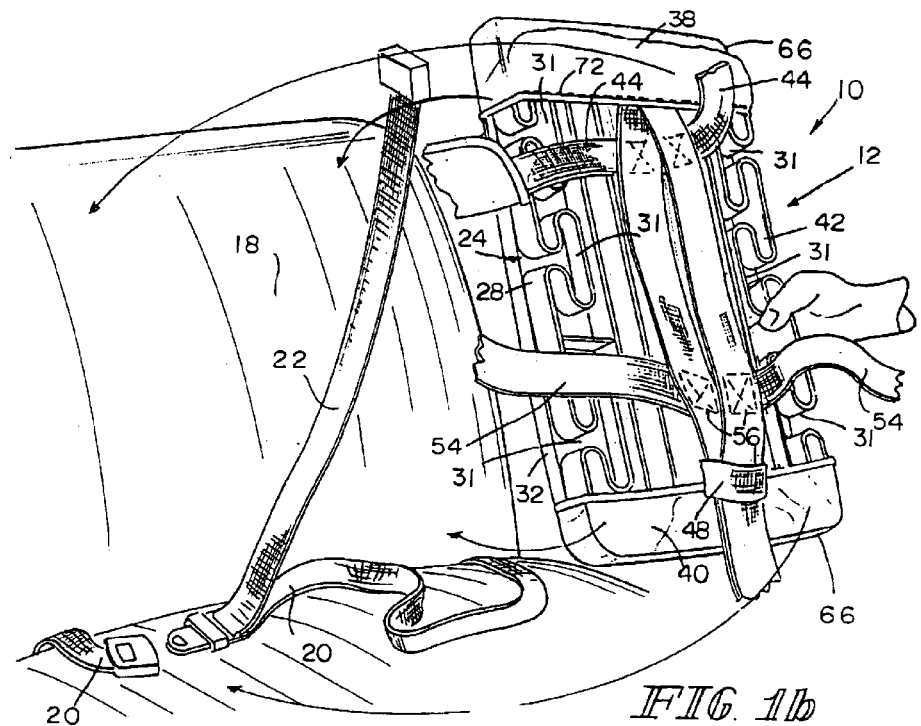
FIG. 1b is a perspective view showing a rear side of the child restraint and showing insertion of the child restraint into the vehicle for coupling to the seat by use of lap and shoulder belts configured to extend through slots formed in a plate included in the child restraint.
Figure 1C:
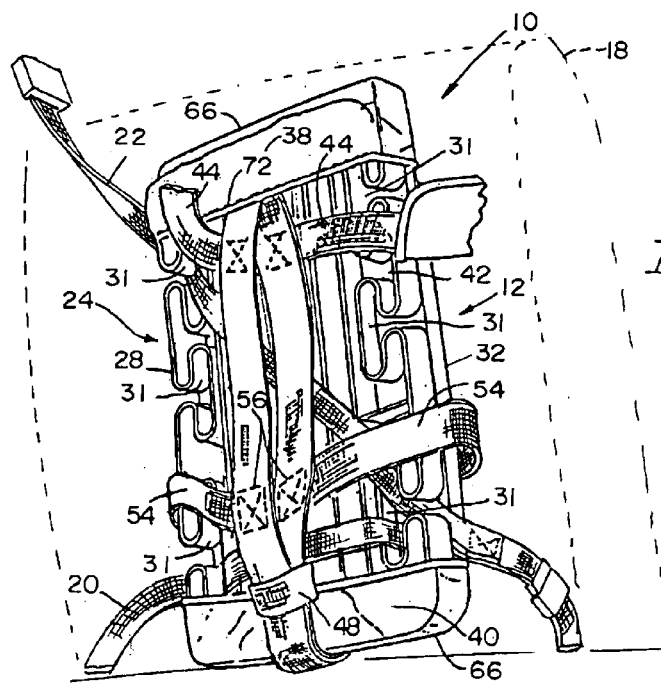
FIG. 1c is a perspective view showing the rear side of the child restraint and showing coupling of the child restraint to the seat (in phantom) by the lap and shoulder belts which extend through slots formed in the plate included in the child restraint.

An apparatus 10 includes a child restraint 12 shown in FIGS. 1a–1c and a bag 14 shown in FIGS. 2–8. Child restraint 12 is configured to restrain a child 16 seated on a seat 18 of, for example, a vehicle, as shown in FIG. 1a. A lap belt 20 and a shoulder belt 22 may be used to secure child restraint 12 on seat 18, as shown, for example, in FIG. 1c, and may be removed from child restraint 12 to allow removal of child restraint 12 from the vehicle. Bag 14 is configured to receive child restraint 12 therein for transport and storage of child restraint 12 upon removal of belts 20, 22 from child restraint 12, as suggested in FIGS. 6–8.

Figure 2:
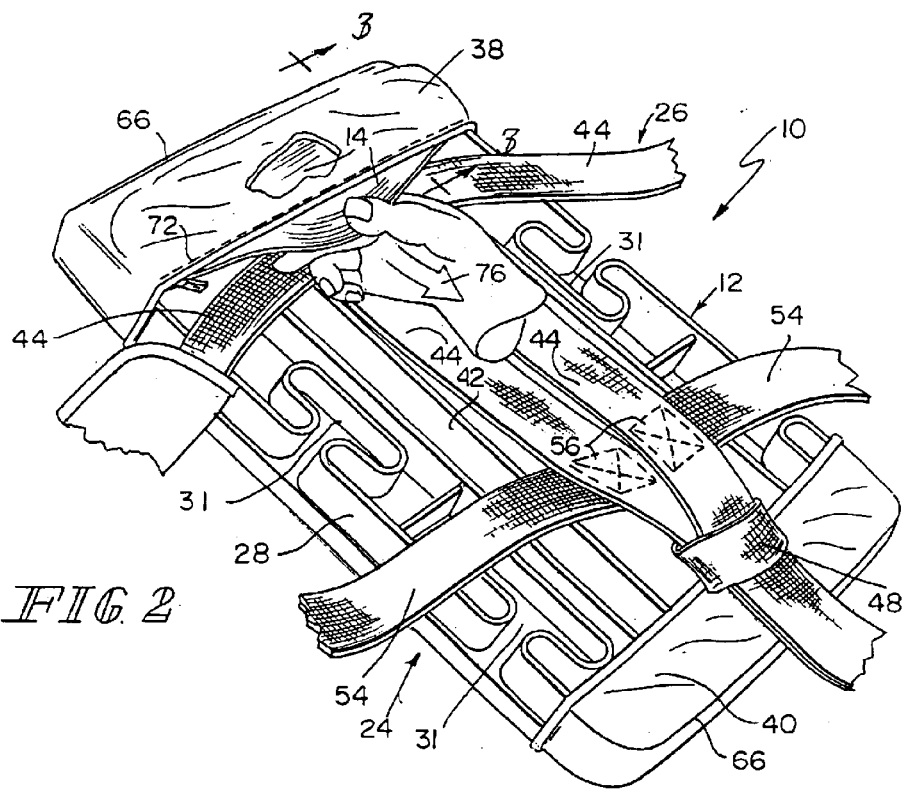
FIG. 2 is a perspective view, with portions broken away, showing pulling on a bag to release the bag from a pouch extending along the rear side of the child restraint to prepare the bag to receive the child restraint therein for transport and storage of the child restraint.

Child restraint 12 includes a back support 24 and a restraint unit 26, as shown, for example, in FIGS. 1a and 2. Back support 24 is configured to support the back of seated child 16. Restraint unit 26 is coupled to back support 24 and configured to restrain seated child 16 against back support 24.

Back support 24 includes a relatively hard plate 28 and a relatively soft pad 30, as shown, for example, in FIGS. 1b, 1c, 3, and 5. A number of slots 31 shown, for example, in FIGS. 1b and 1c are formed in plate 28 to receive lap belt 20 and shoulder belt 22. In the illustrated embodiment, plate 28 is formed to include three slots 31 on one side of plate 28 and three slots 31 on an opposite side of plate 28. To mount child restraint 12 on seat 18, lap belt 20 is routed through, for example, the two bottom slots 31 and shoulder belt 22 is routed through, for example, one of the top slots 31 and a bottom slot 31 located diagonally from the top slot 31 through which shoulder strap 22 extends, as shown, for example, in FIG. 1c.

Figure 3:
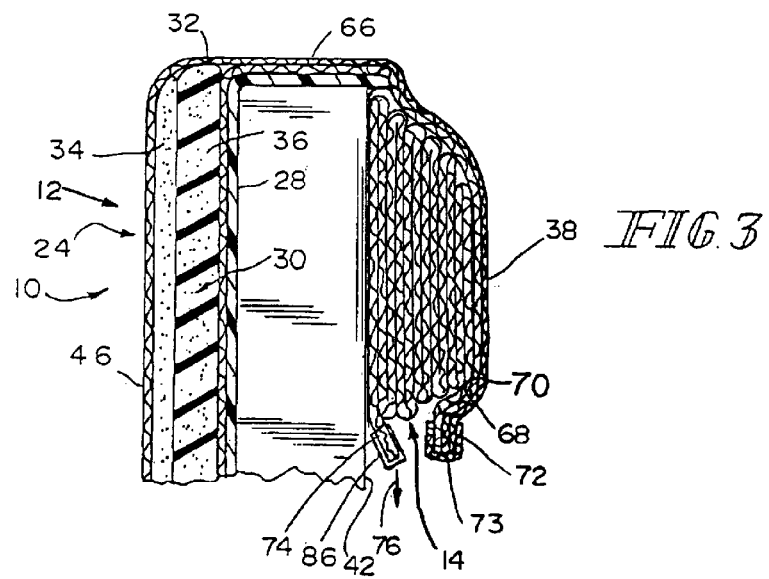
FIG. 3 is a sectional view taken along lines 3—3 of FIG. 2 showing the bag contained in the pouch.

Pad 30 is contained in a pad cover 32 and is positioned in front of plate 28 to cushion the back of seated child 16, as shown, for example, in FIG. 3. In the illustrated embodiment, pad 30 includes an outer layer 34 made of, for example, polyester fiber and an inner layer 36 made of, for example, urethane foam.

Child restraint 12 includes a top pouch 38 and a bottom pouch 40, as shown, for example, in FIG. 2. Pouches 38, 40 are positioned along a rear side 42 of back support 24 and are coupled to pad cover 32. Each pouch 38, 40 receives an end portion of plate 28 therein.

In the illustrated embodiment, restraint unit 26 is a harness unit. Harness unit 26 includes a pair of shoulder straps 44 shown in FIGS. 1a and 2. Shoulder straps 44 extend along a front side 46 of back support to restrain the shoulders and legs of seated child 16 and extend along rear side 42 through top and bottom loops 48 (one shown in FIGS. 2, 6, and 7) coupled to plate 28. One of shoulder straps 44 is longer than the other shoulder strap 44 to provide a crotch strap 50 shown, for example, in FIG. 1*a*. Shoulder straps 44 and crotch strap 50 are coupled to a buckle unit 52 shown, for example, in FIG. 1*a*. A connector strap 54 shown in 2 and 6 extends between shoulder straps 44 and is coupled thereto by stitching 56 and a pair of buckles (not shown) to allow lengthening and shortening of the effective length.

Figure 4:
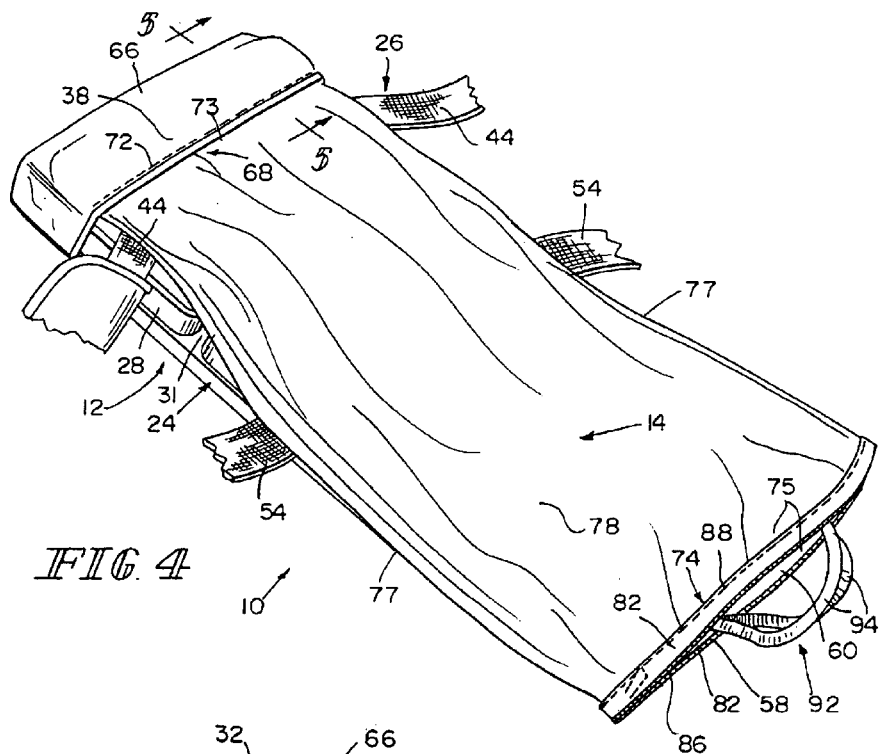
FIG. 4 is a perspective view showing deployment of the bag from the pouch.

Child restraint 12 can be put in bag 14 for transport and storage of child restraint 12 and removed from bag 14 for use of child restraint 12, as suggested in FIGS. 2–8. To put child restraint 12 in bag 14, bag 14 is turned right-side in (FIG. 8). As bag is turned right-side in, bag 14 receives back support 24 and restraint unit 26 through an opening 58 formed in bag 14 into an interior storage region 60 formed in bag 14 as suggested by a solid arrow 62 in FIG. 7. To remove child restraint 12 from bag 14, bag 14 is turned inside out (FIG. 4). As bag 14 is turned inside out, back support 24 and restraint unit 26 are removed from interior storage region 60 through opening 58, as suggested by a phantom arrow 64 in FIG. 7. Bag 14 thus provides means for receiving back support 24 and restraint unit 26 through opening 58 into interior storage region 60 for storage of child restraint 12 and for allowing removal of back support 24 and restraint unit 26 from interior storage region 60 through opening 58 for use of child restraint 12.

Figure 5:
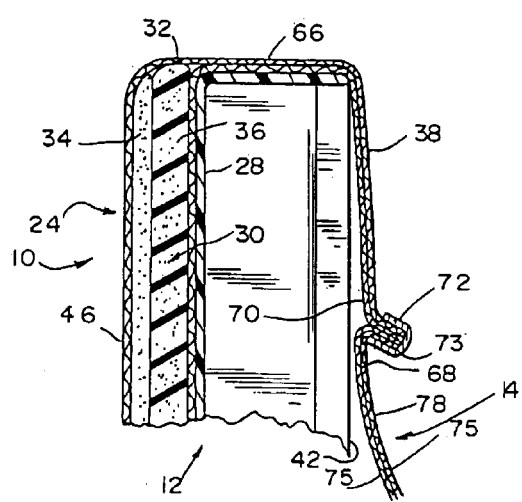
FIG. 5 is a sectional view taken along lines 5—5 of FIG. 4 showing attachment of a closed end portion of the bag to the pouch.

Bag 14 is coupled to one of the end portions 66 of back support 24, as shown in FIGS. 3–5. In the illustrated embodiment, a closed end portion 68 of bag 14 is coupled to an inner surface 70 of top pouch 38 by stitching 72. Closed end portion 68 includes a pair of inner end edges 73 of a pair of panels 75 included in bag 14 and stitched to one another along side edges 77. Inner end edges 73 are coupled to inner surface 70 by stitching 72.

Bag 14 is configured to be positioned in pouch 38 for storage during use of child restraint 12, as shown in FIGS. 2 and 3. Pouch 38 may thus be referred to as a bag receiver.

Bag 14 is inside out when it is positioned in pouch 38. It is inside out in that its inner surface 78 (i.e., the surface used to provide interior storage region 60) faces outwardly and its outer surface 80 faces inwardly.

Bag 14 is configured to be removed from pouch 38 to prepare bag 14. for insertion of child restraint 12 into bag 14, as suggested in FIGS. 2–5. An openable end portion 74 of bag 14 may be pulled in a bag deployment direction 76 to move bag 14 out of pouch 38. Bag 14 remains inside out upon deployment to the position shown in FIG. 4.

To receive child restraint 12 in bag 14, bag 14 is turned right-side in, as suggested in FIGS. 6–8. In the illustrated embodiment, outer end edges 82 of panels 75 are folded outwardly and moved in the direction of arrows 84 shown in FIG. 6 to turn bag 14 right-side in. As bag 14 is turned right-side in, inner surface 78 faces inwardly to provide interior storage region 60 and outer surface 80 faces outwardly. Child restraint 12 is then inserted through opening 58 into interior storage region 60 for storage therein.

Once child restraint 12 is positioned in interior storage region 60, a bag closer coupled to openable end portion 74 along outer end edges 82 can be used to close opening 58 and contain child restraint 12 in interior storage region 60. In the illustrated embodiment shown in FIG. 8, the bag closer is a zipper 86 coupled to openable end portion 74 by stitching 88. In the illustrated embodiment shown in FIG. 9, the bag closer is a draw string 90.

Bag 14 includes a handle 92 for carrying bag 14 when child restraint 12 is positioned in interior storage region 60, as shown in the embodiment illustrated in FIG. 8. Handle 92 includes a handle member 94 coupled to each panel 75 adjacent to outer end edge 82 thereof

What is claimed is:

1. An apparatus comprising
   a child restraint including a back support configured to support a back of a seated child and a restraint unit configured to restrain the seated child against the back support, and
   means for receiving the back support and the restraint unit through an opening into an interior storage region for storage of the child restraint and for allowing removal of the back support and the restraint unit from the interior storage region through the opening for use of the child restraint, the means including a bag coupled to the child restraint and formed to include the opening and the interior storage region,
   wherein the back support includes a plate, a pad configured to be positioned between the plate and the back of the seated child, a pad cover containing the pad, and a pouch coupled to the pad cover and receiving the plate therein, and the bag is coupled to the pouch and configured to be inserted in the pouch for storage during use of the child restraint.

2. The apparatus of claim 1, wherein the bag includes first and second panels, each panel includes inner and outer end edges and first and second side edges extending between the inner and outer end edges, the inner end edges are coupled to an inner surface of the pouch, the first side edges are coupled to one another, the second side edges are coupled to one another, the outer end edges are coupled to a zipper, the bag includes a handle to carry the bag with the child restraint positioned in the interior storage region, and the handle includes a first handle member coupled to the first panel and a second handle member coupled to the second panel.

3. An apparatus comprising
   a child restraint including a back support configured to support a back of a seated child and a restraint unit configured to restrain the seated child against the back support, and
   a bag coupled to the child restraint, the bag being configured for reception of the back support and the restraint unit through an opening formed in the bag into an interior storage region formed in the bag for storage of the child restraint and being configured for removal of the back support and the restraint unit from the interior storage region through the opening for use of the child restraint,
   wherein the back support includes an end portion and the bag is coupled to the end portion to facilitate reception of the child restraint through the opening into the interior storage region upon turning the bag right-side in and to facilitate removal of the child restraint from the interior storage region through the opening upon turning the bag inside out.

4. The apparatus of claim 3, wherein the bag includes first and second panels coupled to the back support and to one another to define the interior storage region and the opening and the bag includes a bag closer coupled to the first and second panels to close the opening.

5. An apparatus comprising
   a child restraint including a back support configured to support a back of a seated child and a restraint unit configured to restrain the seated child against the back support, and a bag coupled to the child restraint, the bag being configured for reception of the back support and the restraint unit through an opening formed in the bag into an interior storage region formed in the bag for storage of the child restraint and being configured for removal of the back support and the restraint unit from the interior storage region through the opening for use of the child restraint, wherein the bag includes a closed end portion and an openable end portion, the closed end portion is coupled to an end portion of the back support, and the openable end portion is configured to be opened to define the opening.

6. The apparatus of claim 5, wherein the back support includes a pouch extending along a rear side of the back support, the closed end portion is coupled to the pouch, and the openable end portion is configured to be positioned in the pouch during use of the child restraint and to be removed from the pouch for storage of the child restraint in the bag.

7. The apparatus of claim 6, wherein the back support includes a pad to cushion the back of the seated child and a plate extending into the pouch and positioned between the pad and the closed end portion of the bag.

8. An apparatus comprising a child restraint including a back support configured to support a back of a seated child and a restraint unit configured to restrain the seated child against the back support, and a bag coupled to the child restraint, the bag being configured for reception of the back support and the restraint unit through an opening formed in the bag into an interior storage region formed in the bag for storage of the child restraint and being configured for removal of the back support and the restraint unit from the interior storage region through the opening for use of the child restraint, wherein the child restraint includes a bag receiver configured to receive the bag for storage of the bag during use of the child restraint.

9. The apparatus of claim 8, wherein the bag receiver is positioned along a rear side of the back support.

10. The apparatus of claim 8, wherein the bag receiver is a pouch.

11. An apparatus comprising a child restraint including a back support configured to support a back of a seated child and a restraint unit configured to restrain the seated child against the back support, and a bag coupled to the child restraint, the bag being configured to be turned right-side in to receive the back support and the restraint unit through an opening formed in the bag into an interior storage region formed in the bag for storage of the child restraint and being configured to be turned inside out for removal of the back support and the restraint unit from the interior storage region through the opening for use of the child restraint.

12. The apparatus of claim 11, wherein the bag includes a closed end portion and an openable end portion, the closed end portion is coupled to the back support, and the openable end portion is configured to be opened to define the opening.

13. The apparatus of claim 12, wherein the bag includes a handle coupled to the openable end portion to carry the bag with the child restraint positioned in the interior storage region.

14. The apparatus of claim 12, wherein the bag includes a zipper coupled to the openable end portion to open and close the openable end portion.

15. The apparatus of claim 12, wherein the bag includes a draw string coupled to the openable end portion to open and close the openable end portion.

16. The apparatus of claim 12, wherein the back support includes a plate, a pad configured to be positioned between the plate and the back of the seated child, a pad cover containing the pad, and a pouch coupled to the pad cover and receiving the plate therein, the closed end potion of the bag is coupled to the pouch, and the bag is configured to be inserted in the pouch for storage during use of the child restraint.

17. The apparatus of claim 11, wherein the back support includes a pouch and the bag is coupled to the pouch and configured to be inserted in the pouch for storage during use of the child restraint.

* * * * *